United States Patent [19]
Bihn et al.

[11] Patent Number: 5,261,271
[45] Date of Patent: Nov. 16, 1993

[54] EXHAUST BACKPRESSURE TESTER

[75] Inventors: Robert F. Bihn, North Olmsted, Ohio; Freeman C. Gates, Jr., Southfield, Mich.

[73] Assignee: Ford Motor Company, Dearborn, Mich.

[21] Appl. No.: 826,524

[22] Filed: Jan. 27, 1992

[51] Int. Cl.⁵ ........................................ G01M 15/00
[52] U.S. Cl. ............................................... 73/115
[58] Field of Search .................. 73/115, 714; 123/676, 123/568; 60/291, 292, 293

[56] References Cited

U.S. PATENT DOCUMENTS

| | | | |
|---|---|---|---|
| 3,415,114 | 10/1988 | Crampton et al. | 73/117.2 |
| 3,794,006 | 2/1974 | Woodward | 123/119 A |
| 4,023,358 | 5/1977 | Maurer et al. | 60/277 |
| 4,050,296 | 9/1977 | Benedict | 73/116 |
| 4,133,205 | 1/1979 | Hulls et al. | 73/117.3 |
| 4,179,922 | 12/1979 | Bouverie et al. | 73/116 |
| 4,302,814 | 11/1981 | Full et al. | 364/551 |
| 4,683,857 | 8/1987 | Yasuoka | 123/676 |
| 4,781,059 | 11/1988 | Suzuki et al. | 73/117.3 |

Primary Examiner—Jerry W. Myracle
Attorney, Agent, or Firm—Roger L. May; Allan J. Lippa

[57] ABSTRACT

An exhaust backpressure tester is provided for determining exhaust backpressure in an exhaust system of an internal combustion engine of a motor vehicle. The tester includes a pressure sensor associated with the exhaust system for sensing pressure therein and generating a first signal representative thereof. A comparator is also provided and is connected to the pressure sensor for receiving the first signal, generating a second signal having a value which is representative of substantially zero backpressure in the exhaust system, processing the first signal to compensate it relative to the second signal, and comparing the processed first signal to the second signal to generate a pressure signal which is indicative of the exhaust backpressure in the exhaust system.

15 Claims, 3 Drawing Sheets

EXHAUST BACKPRESSURE TESTER

BACKGROUND OF THE INVENTION

The present invention generally relates to an exhaust backpressure tester, and more particularly, to such a tester which can be employed with a vehicle having an onboard pressure feedback electronic EGR system.

Exhaust systems in vehicles sometimes develop exhaust restrictions which prevent exhaust gases from flowing normally from their engines to the atmosphere. Such restrictions may result from excess carbon deposits in one portion of the exhaust system or from a damaged muffler. Exhaust restrictions create sluggish operation of the engine and, if left uncorrected, may result in damage to the engine.

A further problem which may occur in an exhaust system of a vehicle results when the system's catalytic converter becomes non-operational. While a non-operational catalytic converter would not normally result in a restriction in the exhaust system, it would result in pollutants, such as carbon monoxide, NOx, and hydrocarbons, entering the atmosphere in unreduced quantities.

In the past, technicians have attempted to accurately determine if an exhaust restriction was present in the exhaust system of a vehicle or if the catalytic converter was restricted or otherwise non-operational. This was done by tapping into the exhaust system, taking pressure readings of the backpressure of the system, and estimating whether the backpressure was acceptable. However, since technicians would make estimates without access to definitive acceptable and unacceptable backpressure values for the particular vehicle being tested, incorrect determinations were often made. Consequently, a number of exhaust system components, e.g., catalytic converters, which were not in need of repair were replaced, and components which were in need of repair were not repaired or replaced. Thus, the prior art technique for determining if an exhaust restriction exists in the exhaust system of a vehicle or if the catalytic converter is restricted or otherwise non-operational has been found to be highly unreliable.

Accordingly, a need exists for a reliable backpressure tester which can detect if an exhaust restriction exists in the exhaust system of a vehicle or if the catalytic converter in the vehicle is restricted or otherwise non-operational.

SUMMARY OF THE PRESENT INVENTION

This need is met by the present invention, whereby a reliable backpressure tester is provided for determining backpressure in the exhaust system of an internal combustion engine of a motor vehicle. The tester is capable of determining if an exhaust restriction exists in the exhaust system or if the catalytic converter is non-operational.

In accordance with a first aspect of the present invention, an exhaust backpressure tester is provided for determining backpressure in an exhaust system of an internal combustion engine of a motor vehicle. The tester is used in combination with existing pressure sensor means coupled to the exhaust system for sensing pressure therein and generating a first signal representative of the pressure. The tester comprises comparator means responsive to the first signal received from the existing pressure sensor means for generating a pressure signal indicative of the backpressure in the exhaust system, and connector means for coupling the comparator means to the existing pressure sensor means.

The comparator means generates a second signal having a value which is representative of a substantially zero backpressure in the exhaust system, processes the first signal to compensate it relative to the second signal, and compares the processed first signal to the second signal to generate the pressure signal. The comparator means includes a potentiometer for varying the value of the second signal to adjust the second signal to be representative of substantially zero backpressure in the exhaust system. The comparator means further includes a signal processing amplifier and a buffer amplifier for processing the first signal to compensate it relative to the second signal. A voltmeter is also provided for comparing the processed first signal to the second signal to generate the pressure signal.

In accordance with a second aspect of the present invention, a method is provided for determining exhaust backpressure in an exhaust system of an internal combustion engine of a motor vehicle. The exhaust system includes existing pressure sensor means for sensing pressure therein and generating a first signal representative thereof. The method comprises the steps of monitoring the existing pressure sensor means and receiving the first signal therefrom, and generating a pressure signal indicative of the exhaust backpressure in the exhaust system based upon the first signal.

The step of generating a pressure signal based upon the first signal comprises the steps of: generating a second signal which is representative of a substantially zero backpressure value for the exhaust system of the vehicle; compensating the first signal such that the difference between the compensated first signal and the second signal is zero for substantially zero backpressure in said exhaust system; and, comparing the compensated first signal and the second signal to generate the pressure signal.

Alternatively, the step of generating a pressure signal based upon the first signal may comprise the steps of: generating a second signal which is representative of substantially zero backpressure in the exhaust system; processing the first signal to compensate it relative to the second signal; and, comparing the processed first signal and the second signal to generate the pressure signal.

In accordance with a third aspect of the present invention, an exhaust backpressure tester is provided for detecting exhaust backpressure in an exhaust system of an internal combustion engine of a motor vehicle. The tester comprises: pressure sensor means associated with the exhaust system for sensing pressure therein and generating a first signal representative thereof, and comparator means connected to the pressure sensor means for receiving the first signal, generating a second signal having a value which is representative of substantially zero backpressure in the exhaust system, processing the first signal to compensate it relative to the second signal, and comparing the processed first signal to the second signal to generate a pressure signal which is indicative of the exhaust backpressure in the exhaust system.

In accordance with a fourth aspect of the present invention, a method is provided for detecting exhaust backpressure in an exhaust system of an internal combustion engine of a motor vehicle. The method comprises the steps of: sensing the pressure in the exhaust system and generating a first signal representative thereof; generating a second signal which is representative of a substantially zero backpressure in the exhaust system; compensating the first signal relative to the second signal; and, comparing the compensated first signal and the second signal to generate a pressure signal which is indicative of the backpressure in the exhaust system.

Accordingly, it is an object of the present invention to provide a backpressure tester which is capable of determining backpressure in the exhaust system of an internal combustion engine of a motor vehicle. It is further an object of the present invention to provide a backpressure tester which is capable of indicating if an exhaust restriction exists in the exhaust system, or if the catalytic converter is restricted or otherwise non-operational. It is also an object of the present invention to provide a backpressure tester which is capable of detecting backpressure in the exhaust system of an internal combustion engine of a motor vehicle. These and other objects and advantages will be apparent from the following description, the accompanying drawings and the appended claims.

DETAILED DESCRIPTION OF THE PREFERRED EMBODIMENT

Figure 1:
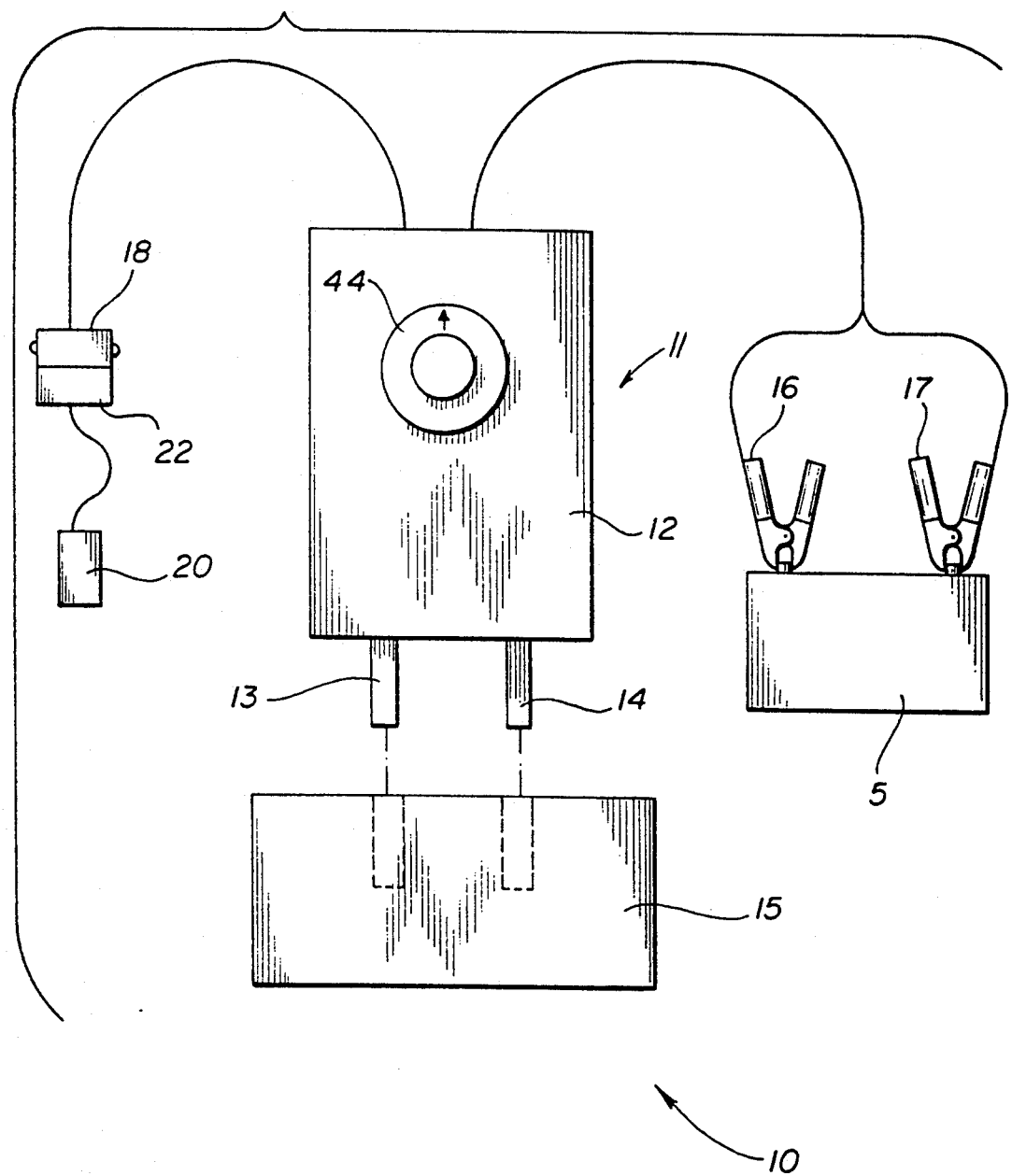
FIG. 1 is a schematic view of the backpressure tester of the present invention.

The backpressure tester of the present invention, which determines backpressure in an exhaust system of a vehicle, is shown in FIG. 1, and is generally designated by the reference numeral 10. The backpressure tester 10 comprises a main body portion 12 having connecting pins 13 and 14 extending therefrom which are received within a voltmeter 15. The main body portion 12 and the voltmeter 15 comprise a comparator means 11, the function of which will be explained below. Voltage supply connectors 16 and 17, which are connected to a car battery 5 or other 12 volt source, are additionally provided and extend from the main body portion 12 and serve to supply power to the tester 10. Connector means comprising a pressure sensor connector 18 also extends from the main body 12 and allows the tester 10 to be coupled to a pressure sensor 20 via a mating connector 2 associated with the sensor 20. As will be discussed in further detail below, the pressure sensor 20 preferably comprises an existing pressure sensor which forms part of a pressure feedback electronic exhaust gas recirculation (EGR) system or may comprise a separate sensor which communicates with the exhaust system via a pressure tap in the exhaust manifold of the vehicle being tested.

Figure 2:
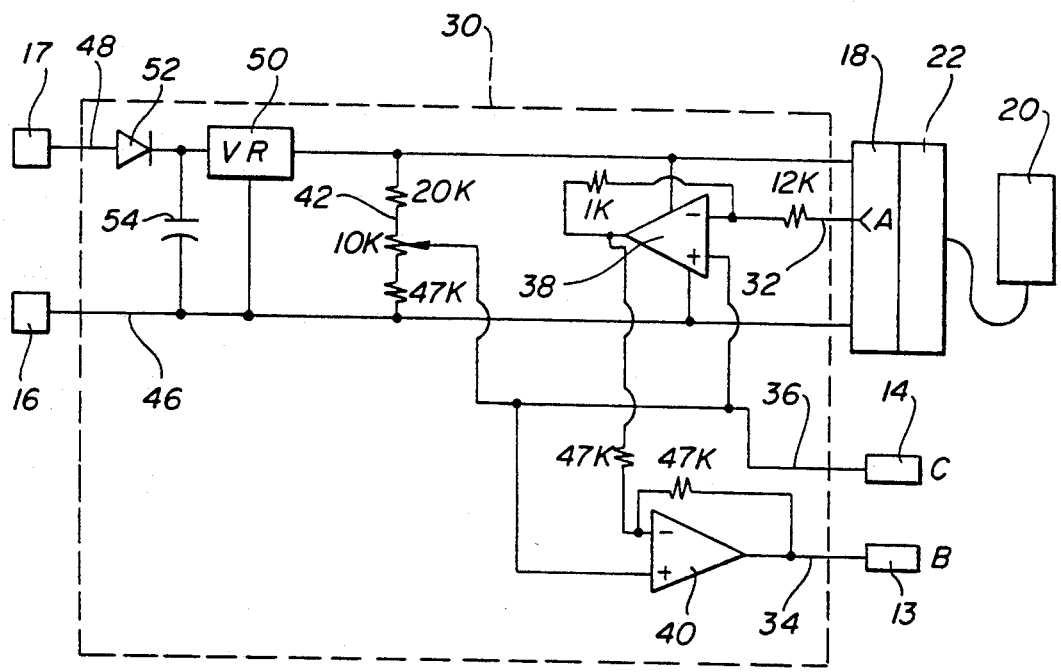
FIG. 2 is a schematic block diagram illustrating a circuit employed by the tester of the present invention.

As shown in FIG. 2, a signal receiving circuit 30 is contained within the main body portion 12 and receives a first voltage signal A from the pressure sensor 20 via conductor 32, which is connected to the pressure sensor connector 18. As will be discussed in more detail below, the signal receiving circuit 30 generates a second signal C having a value which is representative of substantially zero backpressure in the exhaust system, and processes the first signal to compensate it relative to the second signal C. The compensated first signal is designated by the letter B. The compensated signal B and the second signal C are coupled to the voltmeter 15 via conductors 34 and 36, respectively. The conductors 34 and 36 terminate at pins 13 and 14, which, as discussed above, extend from the main body portion 12.

Upon being received by the signal receiving circuit 30, the first signal A passes into a signal processing amplifier 38 which serves to invert and scale-down the signal A. The output signal from the amplifier 38 passes into a buffer amplifier 40, which acts to invert the output signal from the amplifier 38. The output signal from the amplifier 40 is the compensated first signal B on conductor 34 and pin 13.

A potentiometer 42 varies the voltage between pins 13 and 14 for calibration of the tester 10. More particularly, the potentiometer 42 varies the value of the second signal C to adjust the second signal C to be representative of substantially zero backpressure in the exhaust system. Conductor 36 extends from the potentiometer 42 and is connected to the noninverting (+) input of each of the amplifiers 38 and 40 to provide a variable voltage signal, which is the second voltage signal C, to the two amplifiers 38 and 40. A dial 44 is provided on the main body portion 12, as shown in FIG. 1, for adjusting the potentiometer 42 to vary the voltage signal C provided to the two amplifiers 38 and 40. As discussed more explicitly below, while the engine is not running, the potentiometer 42 is varied until the voltage between pins 13 and 14, measured by the voltmeter 15, is substantially equal to zero. When this occurs, the value of the second signal C is representative of substantially zero backpressure in the exhaust system, and the first signal A is compensated relative to the second signal C so that the difference between the compensated first signal B and the second signal C is zero for substantially zero backpressure in the exhaust system.

The voltage supply connectors 16 and 17 are coupled to the circuit 30 by way of conductors 46 and 48, respectively. A voltage regulator 50 is provided for maintaining the voltage at the input of the circuit at substantially 5 volts. The circuit 20 further includes a protective diode 52 which serves to prevent current from passing into the tester 10 if the voltage connectors 16 and 17 are attached improperly at the terminals of the battery 5 or other voltage source. A surge protection capacitor 54 is also provided and acts as a low pass filter to shunt high frequency components of input current to ground.

Figure 3:
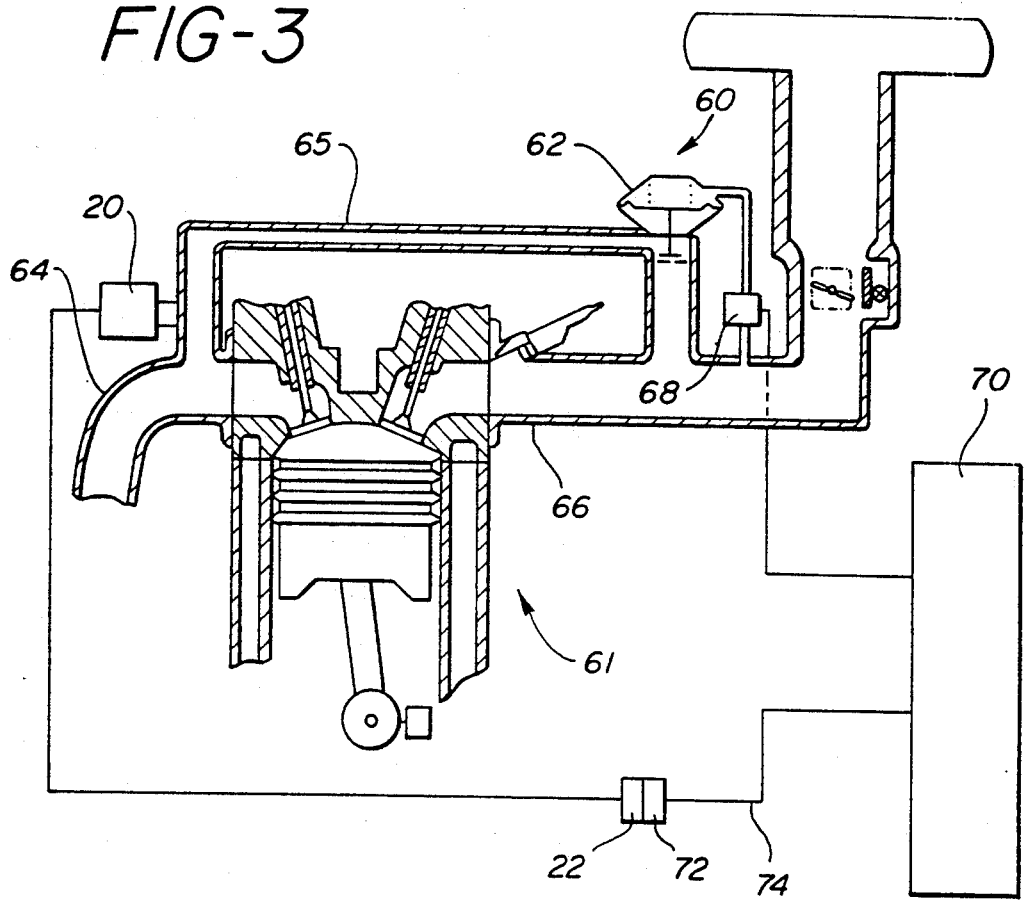
FIG. 3 is an engine system having an electronic EGR system with an onboard pressure sensor which may be employed with the tester of the present invention.

As discussed above, the pressure sensor 20 preferably comprises an existing pressure sensor which forms part of a pressure feedback electronic EGR system 60 of an engine 61, such as shown in FIG. 3. The illustrated EGR system includes an exhaust gas recirculation (EGR) valve 62 which allows a predetermined amount of exhaust gases to flow from the engine's exhaust manifold 64 into its intake manifold 66 via an interconnecting passageway 65. The EGR valve 62 is controlled by an electronic vacuum regulator (EVR) 68 which serves to open or close the EGR valve 62 by way of vacuum. The EVR 68 is controlled in turn by an electronic engine controller 70 which receives the pressure signals generated by the pressure sensor 20. The pressure sensor 20 is connected to the engine controller 70 by its connector 22 which mates with a connector 72 associated with a conductor 74 extending from the controller 70. The pressure sensor 20 may comprise a pressure transducer, commercially available from Kavlico Corp.

The method for employing the tester 10 to determine the backpressure of an exhaust system of a vehicle having an EGR control system, such as shown in FIG. 3, will now be explained. Initially, connectors 16 and 17 are connected to the battery 5 or other 12 volt source and the connector 22 of the pressure sensor 20 is disconnected from the connector 72 associated with the engine controller 70 and connected to connector 18 of the tester 10. The tester 10 is then calibrated with the engine 61 not running, but with the pressure sensor 20 generating voltage signal A. With the engine not running, the voltage signal A is assumed to be representative of substantially zero backpressure in the exhaust system. The dial 44 on the main body portion 12 is then adjusted so as to vary the voltage signals B and C until the voltage between pins 13 and 14, measured by the voltmeter 15, is substantially equal to zero. When this has been done, the value of the second signal C is representative of substantially zero backpressure in the exhaust system, and the first signal A is compensated relative to the second signal C so that the difference between the compensated first signal B and the second signal C is zero for substantially zero backpressure in the exhaust system.

After the tester 10 has been thus calibrated, the engine 61 is started and the voltage signals B and C are compared to one another via the voltmeter 15. The voltmeter 15 senses the voltage value between pins 13 and 14 and generates a pressure signal which is indicative of this voltage value and representative of the backpressure in the vehicle's exhaust system.

A chart or table is preferably supplied with the tester 10 for indicating for each possible measured voltage value whether the backpressure in the vehicle's exhaust system is normal, too high, or too low. Backpressure that is too high may be indicative of a restriction in the exhaust system. Such a restriction may result from excess carbon deposits in one portion of the exhaust system, a restriction in the catalytic converter, or from a damaged muffler. Backpressure that is too low, on the other hand, may be indicative of a catalytic converter that is non-operational. This may result from a damaged ceramic substrate material located in the catalytic converter. Alternatively, instead of using a chart or table to check backpressure, the voltmeter 15 may be calibrated in terms of acceptable or unacceptable values of backpressure.

Figure 4:
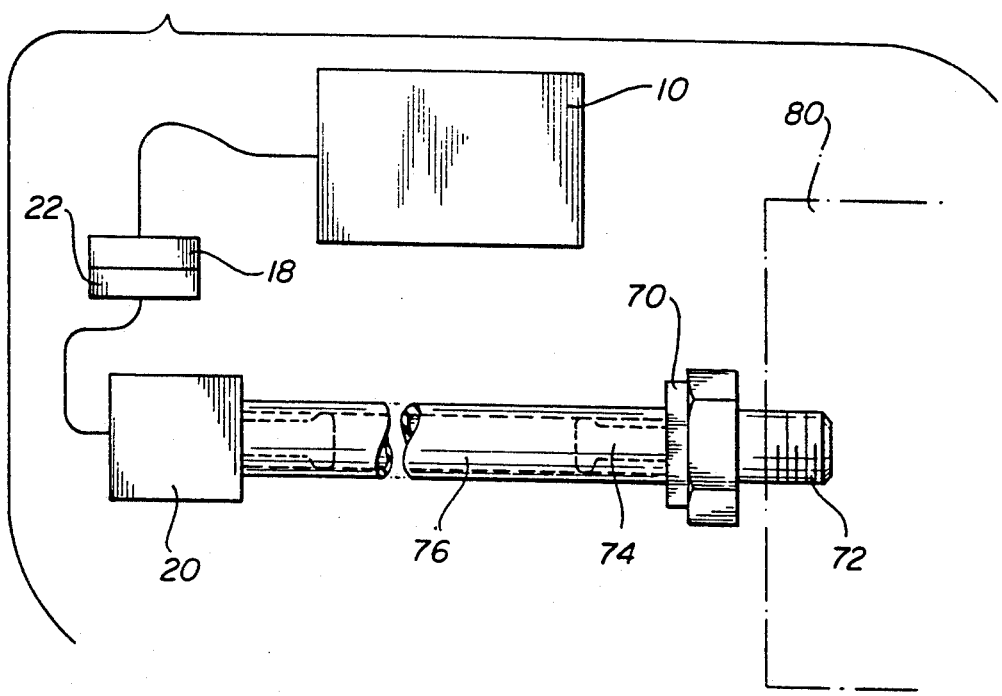
FIG. 4 is side view of a pressure tap which may be used with the tester of the present invention when backpressure is being sensed in a vehicle having an engine which does not include an onboard pressure feedback electronic EGR system.

The tester 10 may also be employed to determine the backpressure of an exhaust system which does not include a pressure feedback electronic EGR system 60, but which includes at least one opening in the exhaust manifold 80 of the engine into which a pressure tap 70, shown in FIG. 4, may be inserted. Many engines include openings in their exhaust manifolds for receiving a sensor, such as an exhaust gas oxygen sensor (not shown). In such a system, the oxygen sensor would be removed and replaced with the pressure tap 70.

The pressure tap 70 includes a threaded portion 72 which allows the tap 70 to be threaded into the opening in the exhaust manifold 80 of the vehicle being tested. A pressure sensor 20, such as the one employed in the pressure feedback electronic EGR system 60 discussed above, would then be connected to a second end 74 of the pressure tap 70 by way of a hose 76. Thereafter, the connector 22 of the pressure sensor 20 would be connected to the connecter 18 of tester 10 so as to supply the circuit 30 with a signal representative of the pressure in the exhaust system in essentially the same manner as described above with regard to the sensor 20 associated with the EGR system 60.

Having described the invention in detail and by reference to preferred embodiments thereof, it will be apparent that modifications and variations are possible without departing from the scope of the invention defined in the appended claims. For example, it is contemplated by this invention that look-up tables having acceptable upper and lower backpressure values may be programmed into an electronic engine controller of a vehicle. The controller would compare sensed pressure values from a pressure sensor associated with a pressure feedback electronic EGR system or the like with values stored in the look-up tables to determine if the backpressure in the exhaust system of the vehicle was acceptable or unacceptable. If unacceptable backpressure is determined, the controller would indicate this by, for example, actuating a warning light visible from the passenger compartment of the vehicle.

What is claimed is:

1. An exhaust backpressure tester for determining backpressure in an exhaust system of an internal combustion engine of a motor vehicle, said tester being used in combination with existing pressure sensor means coupled to the exhaust system for sensing pressure therein and generating a first signal representative of said pressure, said tester comprising:

comparator means for generating a second signal having a value which is presentative of a substantially zero backpressure in said exhaust system, processing said first signal to compensate it relative to said second signal, and comparing said processed first signal to said second signal to generate a pressure signal indicative of said backpressure in said exhaust system; and, connector means for coupling said comparator means to said existing pressure sensor means.

2. An exhaust backpressure tester as set forth in claim 1, wherein said comparator means includes a potentiometer for varying the value of said second signal to adjust said second signal to be representative of substantially zero backpressure in said exhaust system.

3. An exhaust backpressure tester as set forth in claim 1, wherein said comparator means includes a voltmeter for comparing said processed first signal to said second signal to generate said pressure signal.

4. An exhaust backpressure tester as set forth in claim 1, wherein said comparator means includes a signal processing amplifier and a buffer amplifier for processing said first signal to compensate it relative to said second signal.

5. A method for determining exhaust backpressure in an exhaust system of an internal combustion engine of a motor vehicle, said exhaust system including existing pressure sensor means for sensing pressure therein and generating a first signal representative of said pressure, the method comprising the steps of monitoring said existing pressure sensor means and receiving said first signal therefrom; and, generating a pressure signal indicative of the exhaust backpressure in said exhaust system based upon said first signal by performing the steps of:

generating a second signal which is representative of substantially zero backpressure in said exhaust system of said vehicle;

compensating said first signal relative to said second signal so that he difference between the compensated first signal and said second signal is zero for substantially zero backpressure in said exhaust system; and comparing said compensated first signal and said second signal to generate said pressure signal.

6. A method for determining exhaust backpressure in an exhaust system of an internal combustion engine of a motor vehicle, said exhaust system including existing pressure sensor means for sensing pressure therein and generating a first signal representative of said pressure, the method comprising the steps of:

monitoring said existing pressure sensor means and receiving said first signal therefrom; and, generating a pressure signal indicative of the exhaust backpressure in said exhaust system based upon said first signal by performing the steps of:

generating a second signal which is representative of substantially zero backpressure in said exhaust system;

processing said first signal to compensate it relative to said second signal; and comparing said processed first signal and said second signal to generate said pressure signal.

7. A method as set forth in claim 6, wherein said internal combustion engine includes an exhaust manifold, and said pressure sensor means communicates with said exhaust manifold for sensing said pressure in said exhaust system.

8. An exhaust backpressure tester for detecting exhaust backpressure in an exhaust system of an internal combustion engine of a motor vehicle comprising:

pressure sensor means associated with said exhaust system for sensing pressure therein and generating a first signal representative thereof; and comparator means connected to said pressure sensor means for receiving said first signal, generating a second signal having a value which is representative of substantially zero backpressure in said exhaust system, processing said first signal to compensate it relative to said second signal, and comparing said processed first signal to said second signal to generate a pressure signal which is indicative of said exhaust backpressure in said exhaust system.

9. An exhaust backpressure tester as set forth in claim 8, wherein said comparator means includes a potentiometer for varying the value of said second signal to adjust said second signal to be representative of substantially zero backpressure in said exhaust system.

10. An exhaust backpressure tester as set forth in claim 8, wherein said comparator means includes a voltmeter for comparing said processed first signal to said second signal to generate said pressure signal.

11. An exhaust backpressure tester as set forth in claim 8, wherein said comparator means comprises a signal processing amplifier and a buffer amplifier for processing said first signal to compensate it relative to said second signal.

12. An exhaust backpressure tester as set forth in claim 8, further comprising means for connecting said comparator means with a power supply.

13. A method for detecting exhaust backpressure in an exhaust system of an internal combustion engine of a motor vehicle comprising the steps of:

sensing the pressure in said exhaust system and generating a first signal representative thereof;

generating a second signal which is representative of a substantially zero backpressure in said exhaust system;

compensating said first signal relative to said second signal so that the difference between the compensated first signal and said second signal is zero for substantially zero backpressure in said exhaust system; and comparing said compensated first signal and said second signal to generate a pressure signal which is indicative of said backpressure in said exhaust system.

14. A method as set forth in claim 13, wherein a pressure sensor is provided for measuring the pressure in said exhaust system.

15. A method as set forth in claim 14, wherein said internal combustion engine includes manifold, and said pressure in said exhaust system is in said exhaust manifold by said pressure sensor.

* * * * *